US011827253B2

(12) United States Patent
Eitelhuber

(10) Patent No.: US 11,827,253 B2
(45) Date of Patent: Nov. 28, 2023

(54) SYSTEM AND METHOD FOR DOCKING OR UNDOCKING A TRACK-WHEEL BASED DEVICE

(71) Applicant: Georg Robert Eitelhuber, Thuwal (SA)

(72) Inventor: Georg Robert Eitelhuber, Thuwal (SA)

(73) Assignee: NOMADD DESERT SOLAR SOLUTIONS PTE. LTD., Singapore (SG)

( * ) Notice: Subject to any disclaimer, the term of this patent is extended or adjusted under 35 U.S.C. 154(b) by 592 days.

(21) Appl. No.: 16/777,058

(22) Filed: Jan. 30, 2020

(65) Prior Publication Data

US 2021/0242828 A1    Aug. 5, 2021

(51) Int. Cl.
*B61K 7/20*  (2006.01)
*H02S 40/10*  (2014.01)
*B25J 11/00*  (2006.01)
*B08B 11/04*  (2006.01)
*B60C 7/00*  (2006.01)
*B60C 11/03*  (2006.01)
*B60C 19/00*  (2006.01)
*B61K 7/00*  (2006.01)

(52) U.S. Cl.
CPC .............. *B61K 7/20* (2013.01); *B08B 11/04* (2013.01); *B25J 11/0085* (2013.01); *B60C 7/00* (2013.01); *B60C 11/032* (2013.01); *B60C 19/00* (2013.01); *B61K 7/00* (2013.01); *H02S 40/10* (2014.12); *B60C 2200/00* (2013.01)

(58) Field of Classification Search
CPC ... B61K 7/00; B61K 7/16; B61K 7/18; B61K 7/20; B60C 7/00; B60C 11/032; B60C 19/00; B60C 2200/00; B08B 11/04; B25J 11/0085; H02S 40/10; Y02E 10/40; F24S 40/20
USPC .................................................. 104/249–260
See application file for complete search history.

(56) References Cited

U.S. PATENT DOCUMENTS

| 1,148,870 A * | 8/1915 | Stansell et al. | B61K 7/20 104/257 |
| 1,379,398 A * | 5/1921 | Duffy | B61K 7/20 104/258 |
| 1,541,892 A * | 6/1925 | Bein | B61K 7/20 104/260 |

(Continued)

FOREIGN PATENT DOCUMENTS

IN    309341 B    11/2016

*Primary Examiner* — Zachary L Kuhfuss

(57) ABSTRACT

This disclosure relates to system and method for docking or undocking a track-wheel based device. In some embodiments, the system may include a docking station configured to be fitted on a support track for the track-wheel based device. The docking station may include a protrusion to be fitted at a first position on the support track. The protrusion may be configured to make the track-wheel slide on the support track against the protrusion until an indentation on the track-wheel engages with the protrusion upon alignment. The system may further include an end-dock to be fitted at a second position on the support track. A segment of the support track between the first position and the second position is configured to accommodate the track-wheel during docking.

14 Claims, 5 Drawing Sheets

(56) References Cited

U.S. PATENT DOCUMENTS

| | | | | | |
|---|---|---|---|---|---|
| 1,544,369 | A | * | 6/1925 | Breyley | B61K 7/20 104/260 |
| 1,598,741 | A | * | 9/1926 | Nelson | B66C 21/00 104/260 |
| 9,080,791 | B1 | | 7/2015 | Meller et al. | |

* cited by examiner

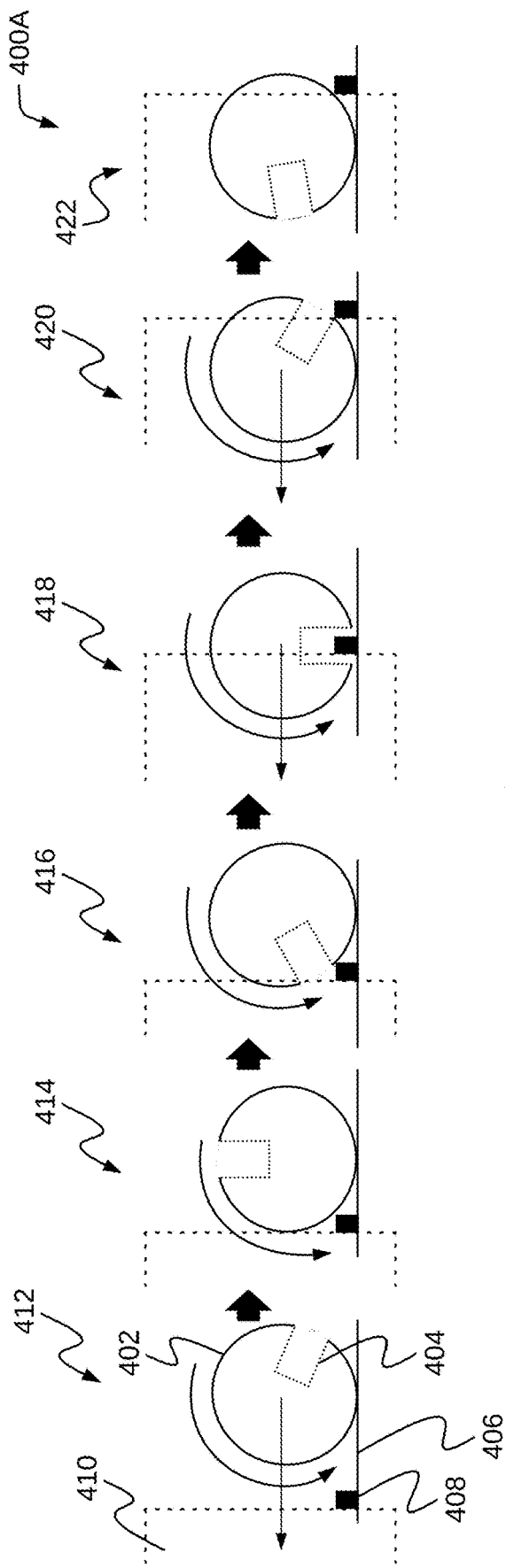
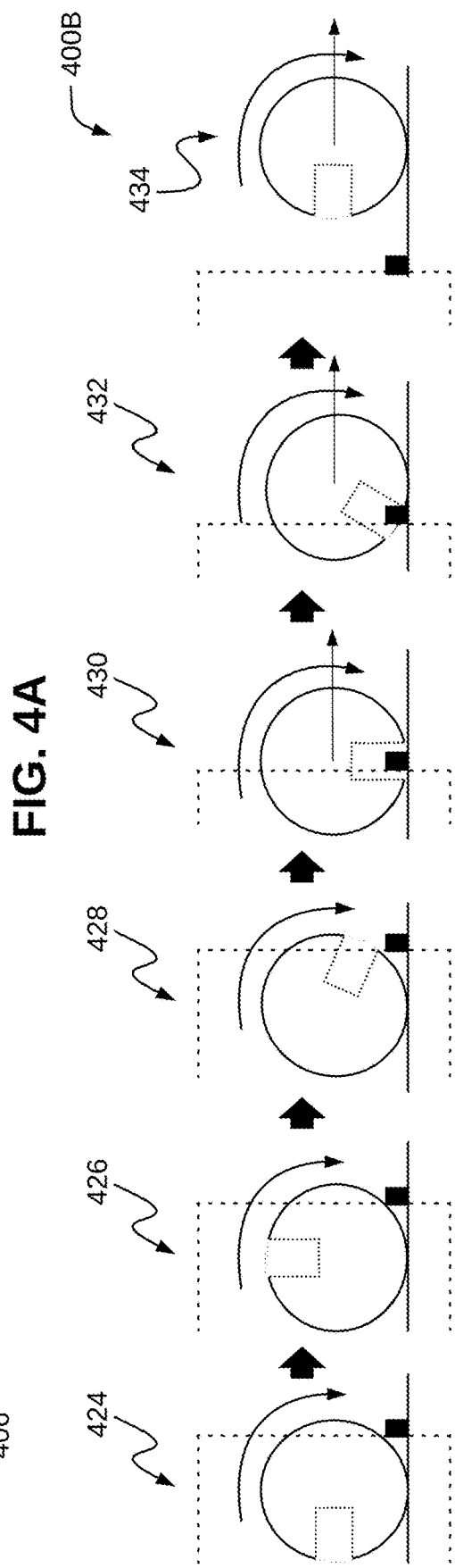
FIG. 4A
FIG. 4B

SYSTEM AND METHOD FOR DOCKING OR UNDOCKING A TRACK-WHEEL BASED DEVICE

TECHNICAL FIELD

This disclosure relates generally to track-wheel based device, and particularly to system and method for docking or undocking a track-wheel based device.

BACKGROUND

There has lately been a steep rise in the adoption of the solar-based technology as an alternative to energy production technologies. This has led to installation of a large number of solar power plants, which use solar panels. As it will be appreciated by those skilled in the art, the solar panels require regular cleaning, for example to remove dust, for efficient working of the solar panels.

Robotic devices may be used for cleaning of the solar panels. For example, a robotic device may be configured to move across the solar panel in order to cover a maximum area of a solar panel. As such, the robotic device may be configured to move on one or more support tracks, like rails. Further, the robotic device may be put to cleaning the solar panels, at a scheduled time of the day and for a scheduled time period. After the robotic device has completed its cycle of cleaning, the robotic device may lie in an idle state on the support track.

It may be noted that, in the idle state, if the robotic device is left undocked on the support track, the robotic device may become susceptible to uncontrollable movements, for example, due to an external force such as wind. This uncontrollable movement of the robotic device may lead to undesired outcome, such as shadowing of the solar panel by the robotic device or derailing of the robotic device. These undesired outcomes may affect an overall efficiency of the solar power plant. For example, the shadowing of the solar panels may cause forming of hotspots, which may break the solar panels completely. The uncontrollable movement of the robotic device may further lead to unnecessary wear and tear of components. Therefore, it becomes important to park (that is, to dock) the robotic device at a predetermined location (also called a docking station in the present disclosure) on the support track (for example, at one end of the support track) where it is desired that the robotic device may not move without instructions.

Some current solutions of docking such robotic device may include using a solenoid-based or a latch-based locking mechanism to obstruct the movement of a track-wheel of the robotic device, where the track-wheel is powered by an electric motor. However, such solutions may be affected by problem of motor overcurrent, resulting from improper timing to discharge while the motor is running. Further, a high current is required for energizing the solenoids, which adds to the running cost. Furthermore, these current solutions include a large number of moving parts, which add to the complexity of design, and therefore, require frequent modification in the electronic circuit and in programming. Moreover, a large number of moving parts makes the system more susceptible to corrosion and wear and tear of the parts, adding to maintenance costs.

SUMMARY

In an embodiment, a system for docking or undocking a track-wheel based device is disclosed. The system may include a docking station configured to be fitted on a support track for the track-wheel based device. The docking station may include a protrusion to be fitted at a first position on the support track. The protrusion may be configured to make the track-wheel slide on the support track against the protrusion until an indentation on the track-wheel engages with the protrusion upon alignment. The system may further include an end-dock to be fitted at a second position on the support track. In some embodiments, the second position may be at about the end of the support track. A segment of the support track between the first position and the second position may be configured to accommodate the track-wheel during docking.

In another embodiment, a method of docking or undocking a track-wheel based device is disclosed. The method may include causing, by a device drivetrain, the track-wheel to slide on a support track against a protrusion, fitted on the support track at a first position, until an indentation on the track-wheel aligns with the protrusion. The indentation may be configured to engage with the protrusion upon alignment. The method may further include causing, by a device drivetrain, the track-wheel to engage with the protrusion and further roll over the protrusion upon alignment.

In yet another embodiment, a track-wheel based device for operating on a support track is disclosed. The track-wheel based device may include a track-wheel including an indentation along a circumference of the track-wheel. The indentation may be configured to engage with a protrusion, fitted on the support track, upon alignment. The track-wheel based device may further include a device drivetrain configured to cause the track-wheel to roll on the support track. The device drivetrain may be further configured to cause the track-wheel to slide on the support track against the protrusion, in response to the rolling of the track-wheel being obstructed by the protrusion. The device drivetrain may be further configured to cause the track-wheel to resume the rolling upon engaging of the indentation with the protrusion.

The accompanying drawings, which are incorporated in and constitute a part of this disclosure, illustrate exemplary embodiments and, together with the description, serve to explain the disclosed principles.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 4A depicts a process of docking a track-wheel in a docking region, in accordance with some embodiment of the present disclosure.

FIG. 4B depicts a process of undocking a track-wheel from a docking region, in accordance with some embodiment of the present disclosure.

DETAILED DESCRIPTION

Figure 1A:
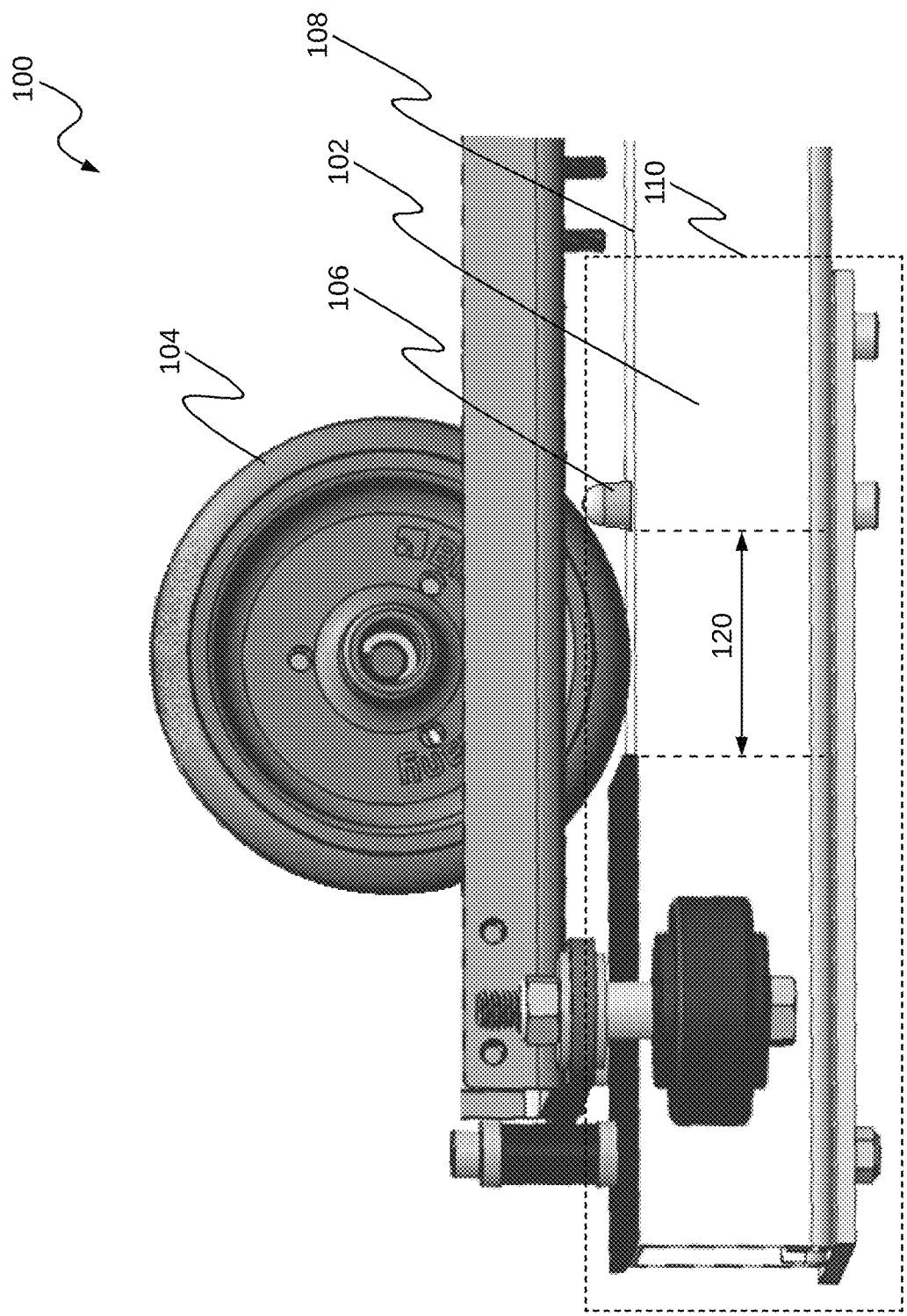
FIG. 1A illustrates a front view of a system for docking or undocking a track-wheel based device, in accordance with some embodiments of the present disclosure.

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

A system for docking and undocking a track-wheel based device is disclosed. By way of an example, the track-wheel based device may be configured to move along a support track, like a rail, so as to perform an operation, such as cleaning of a solar panel. The track-wheel based device may be docked inside the docking region, when the track-wheel based device is lying idle on the support track, i.e. not performing any operation. The docking region may be located at one end of the support track. By docking the track-wheel based device inside the docking region, the track-wheel based device may be prevented from wandering on the support track under influence of an external force, like wind.

In some embodiments, the track-wheel based device may include one or more track-wheels. At least one track-wheel, or simply a track-wheel, of the one more track-wheels may include an indentation, like a hole or a depression (slot), or both. Further, the track-wheel may be powered by a device drivetrain (like an electric motor) to rotate. The track-wheel based device may be configured to move along a support track, like a rail which may include a protrusion. As the track-wheel is rotated by the device drivetrain, the track-wheel may roll on the support track, to eventually encounter the protrusion on the support track. This protrusion may obstruct the rolling of the track-wheel, thereby causing the track-wheel to slide at one position, against the protrusion, on the support track. As the wheel may continue to slide in an attempt to roll over the protrusion, the engaging member of the track-wheel may engage with the protrusion on the support track, at some point in the track-wheels rotation. Once the engaging member of the track-wheel is engaged with the protrusion, the wheel may roll over the protrusion. As a result, the track-wheel based device may move across the protrusion inside the docking region where the track-wheel based device may be confined.

The system is able to differentiate between an active movement and a passive movement of the of the track-wheel. For example, the system may be able to differentiate between the active movement caused by the device drivetrain and the passive movement caused by any source of motive force other than the device drivetrain, i.e. an external force. For example, the external force may be of an inadvertent manual push, wind, an inclination of the rail, etc. Accordingly, the system may allow the active movement caused by the device drivetrain and avoid the passive movement caused by the external force. It may be noted that the system is able to differentiate between the active movement and passive movement without any active control or sensing mechanism, and without the use of any additional moving parts.

Referring now to FIG. 1A, a front view of a system 100 for docking and undocking a track-wheel based device is illustrated, in accordance with some embodiments, of the present disclosure. In some embodiments, the system 100 may include a support track 102. It may be noted that the support track 102 may be any surface capable of supporting a track-wheel on it. For example, the support track 102 may be an edge of a panel, a beam, a rail, etc. The track-wheel 104 may be configured to roll on the support track 102. In some embodiments, the track-wheel 104 may support a track-wheel based device (not shown in the FIG. 1). For example, the track-wheel based device may include a robotic device which may be configured to perform one or more operations on a solar panel. For example, the one or more operations may include cleaning of the solar panel.

In some embodiments, the system 100 may include a docking station 110. The docking station 110 may further include a protrusion 106. In some embodiments, the protrusion 106 may be configured to be positioned on a top surface 108 of the support track 102. Further, the protrusion 106 may be configured to be positioned at a first position with respect to the support track 102. In some embodiments, the protrusion 106 may include a crown. In such embodiments, a fastener, for example a screw, may be fitted in the support track 102, and the crown nut may be screwed onto one end of the screw, such that the crown nut (i.e. the crown of the crown nut) may form the protrusion 106 on the surface of the support track 102. In some embodiments, the crown nut may be of a plastic-based material, or any other material known in the art.

Figure 1B:
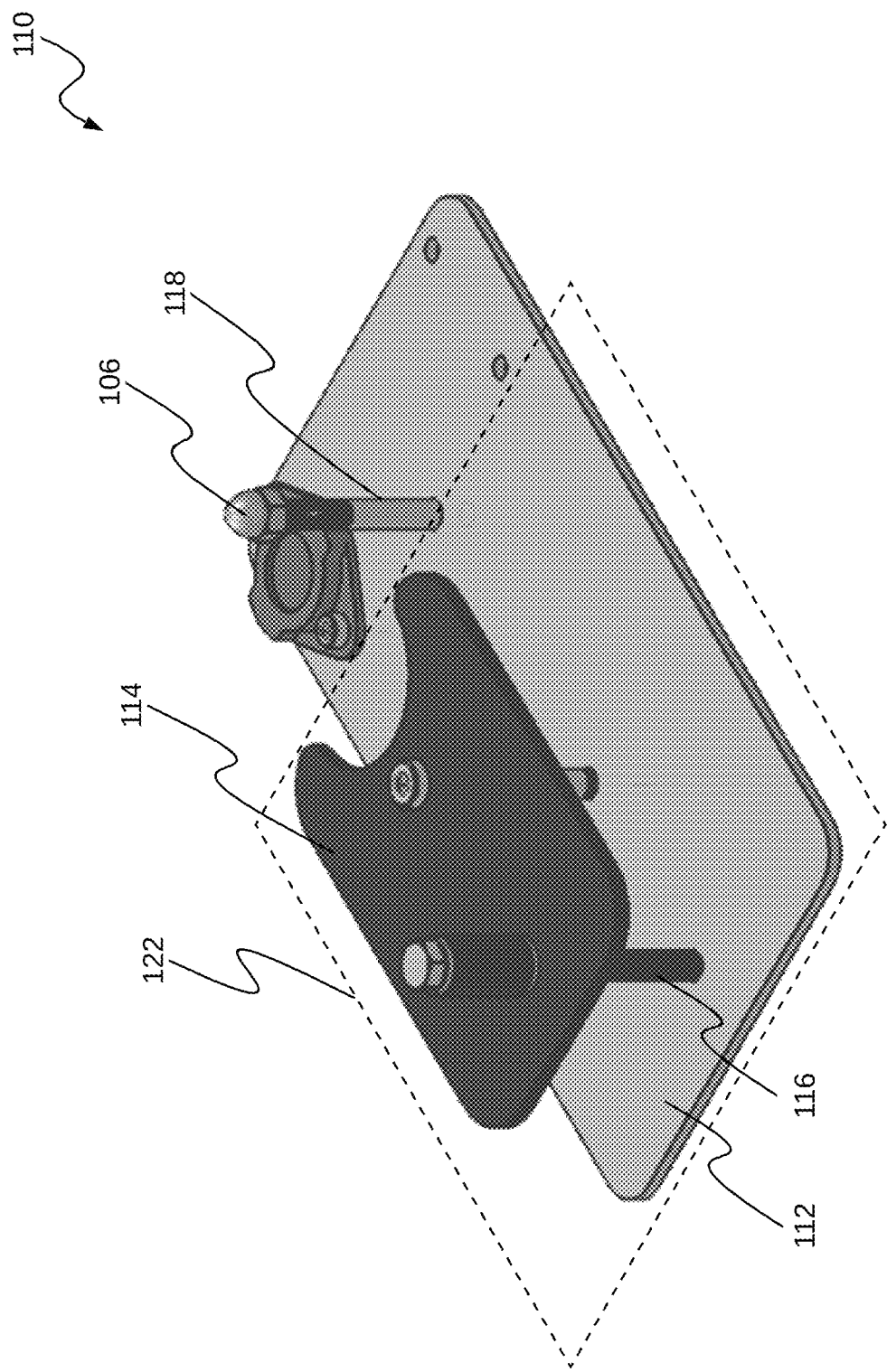
FIG. 1B illustrates a perspective view of a docking station, in accordance with some embodiments of the present disclosure.

In some embodiments, the docking station 110 may further include an end-dock 122. In some embodiments, the end-dock 122 may include a bottom plate 112 and a top plate 114. The end-dock 122 may be positioned at a second position with respect to the support track 102. It may be noted that a segment of the support track 102 between the first position (where the protrusion 106 is positioned) and the second position (where the docking station 110 is positioned) may define a docking region 120 which may accommodate the track-wheel 104 (and, therefore, the track-wheel based device) during docking (i.e., during an idle state). Referring to FIG. 1B, a perspective view of the docking station 110 is illustrated, in accordance with some embodiments of the present disclosure. In some embodiments, the top plate 114 may be shaped to accommodate a shape of the track-wheel 102. In some embodiments, the docking station 110 may also include the support track 102 (not shown in FIG. 1B).

In an embodiment, the docking station 110 may be integrated into or permanently fitted to the support track 102. In such an embodiment, the end-dock 122 may be integrated into the support track 102, i.e., the bottom plate 112 and the top plate 114 may be formed as a part of the support track 102 at a second position, at the time of manufacturing of the support track 102. Further, in such embodiment, the protrusion 106 may be integrated into the support track 102 at a first position.

In another embodiment, the docking station 110 may be factory fitted to the support track 102 (for example, existing support track). In other words, the docking station 110 may be fitted to the support track 102 before the support track 102 is installed on a work site. In yet another embodiment, the docking station 110 may be configured to be retrofitted to the support track 102 (for example, existing support track). In other words, the docking station 110 may be fitted to the support track 102 after the support track 102 is installed on the work site. In such embodiments, the end-dock 122 may further include a set of fasteners 116, for example, a bolt or a rivet. Thus, the bottom plate 112 and the top plate 114 may be fitted to the support track 102 using the bolt.

In some embodiments, a screw 118 may be fitted in the support track 102, and a crown nut may be screwed onto one end of the screw 118, such that the crown nut may form the protrusion 106 on the surface of the support track 102. As mentioned earlier, the indentation may include a hole and/or a depression, such that the indentation may be configured to engage with the protrusion 106.

A method of assembling a docking station is disclosed. In some embodiments, at least a first hole and a second hole may be drilled in the support track 102. For example, the first hole and the second hole may be drilled in the support track 102 in a vertical orientation. Once each of the first hole and the second is drilled, the end-dock 122 may be fitted on the support track 102. As mentioned above, the end-dock 122 may include the bottom plate 112, the top plate 114, and the bolt 116. Further, each of the bottom plate 112 and the top plate 114 may include a first hole and second hole. By way of an example, the end-dock 122 may be fitted on the support track 102 by positioning the bottom plate 112 and the top plate 114 along the bottom and the top of the support track and inserting and fixing the bolt 116 through the first hole (i.e. the first hole of the support track 102, the first hole of the bottom plate 112, and the first hole of the top plate 114). Once the end-dock 122 is fitted on the support track 102, the screw may be inserted through the second hole. The screw may be fitted on the end-dock 122 using the crown head, so that the crown head forms the protrusion 106.

Returning back to FIG. 1A, in some embodiments, the track-wheel 104 may be fitted to the track-wheel based device. In alternate embodiments, the track-wheel 104 may be detachably coupled to the track-wheel based device. It may be understood that the track-wheel 104 may be caused to roll on the support track 102, so as to displace the track-wheel based device along the support track 102. To this end, the track-wheel 104 may be powered by a device drivetrain (not shown in the FIG. 1A). For example, the device drivetrain may include an electric motor. It may be understood that the device drivetrain may impart a rotation motion to the track-wheel 104, to thereby rotate the track-wheel 104, and cause the track-wheel 104 to roll on the support track 102.

The track-wheel 104 may include an indentation on an outer surface along the circumference of the track-wheel 104 (on an outer edge of the track-wheel 104). By way of an example, the indentation may include a hole and/or a depression. In other words, the indentation may be in form of a depression or a hole, or a combination of both. For example, the depression may be formed into the track-wheel 104 on the outer surface of the track-wheel 104. The track-wheel 104 is further explained in detail, in conjunction with FIGS. 2A-2C.

Figure 2C:
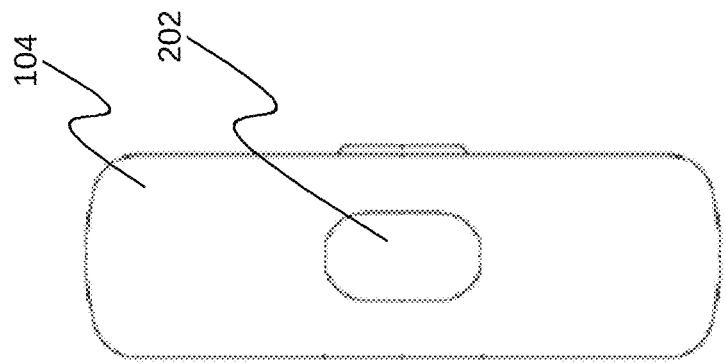
FIGS. 2A-2C illustrate different views of a track-wheel, in accordance with some embodiments of the present disclosure.
Figure 2B:
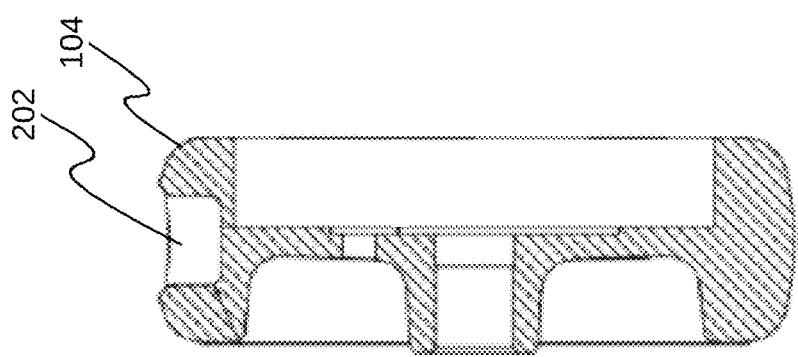
Figure 2A:
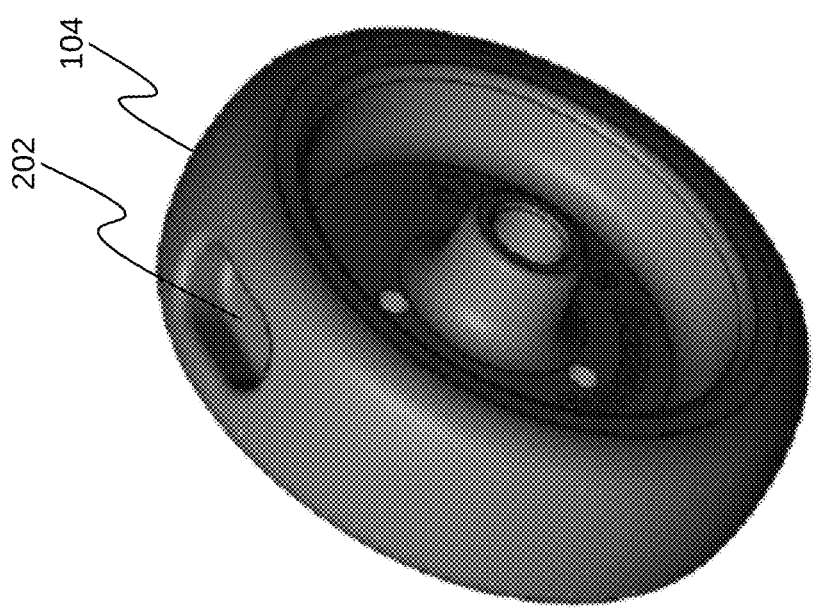

Referring now to FIG. 2A-2C, different views of the track-wheel 104 are illustrated, in accordance with at an embodiment of the present disclosure. FIG. 2A shows a perspective view of the track-wheel 104, in accordance with an embodiment. As shown in the FIG. 2A, the track-wheel 104 includes an indentation 202. As shown in FIG. 2A, the indentation 202 may be a depression (slot) present on an outer surface along the circumference of the track-wheel 104.

In some embodiments, the track-wheel 104 may further include a base (not shown in FIGS. 2A-2C) and a rim (not shown in FIGS. 2A-2C) mounted on an outer edge of the base. For example, the base may be made of metal. Further, the rim may be made of rubber, so as to provide traction to the track-wheel 104 during rolling on the support track 102. Further, in such embodiments, the rim may include the indentation 202. For example, a depression may be formed in the structure of the rim. Further, in some embodiments, the indentation 202 may be positioned in the middle of the outer edge of the wheel or the rim.

FIGS. 2B and 2C show front views of the track-wheel 104 in two different orientations of the track-wheel 104, respectively, in accordance with some embodiments of the present disclosure. A length, a width, and a depth of the depression may be selected as per the requirement.

The indentation 202 may be configured to engage with the protrusion 106 on the support track 102. It may be noted that the drivetrain may cause the track-wheel to roll on the support track until the track-wheel encounters the protrusion 106 on the support track 102. Once the track-wheel 104 encounters the protrusion 106, the rolling of the track-wheel 104 may be obstructed by the protrusion 106, and as a result, the track-wheel 104 may start sliding (i.e. rotate at one position on the support track 102) on the support track against the protrusion 106 under the effect of the device drivetrain. The track-wheel 104 may continue to slide on the support track 102 against the protrusion 106, until the indentation 202 aligns with the protrusion 106. Upon alignment, the indentation 202 may engage with the protrusion 106, and simultaneously, the track-wheel 104 may resume rolling over the protrusion 106. In other words, once the rolling of the track-wheel 104 is obstructed by the protrusion 106, the track-wheel 104 may start sliding until the indentation 202 of the track-wheel 104 reaches and eventually engages with the protrusion 106. It may be noted that once the track-wheel 104 resumes rolling, the track-wheel 104 may enter a docking region 120, where the track-wheel 104 may be desired to be docked and confined in.

It may be further noted that when the track-wheel 104 is docked in the docking region 120, the active movement provided by the device drivetrain may be stopped, and the track-wheel 104 may lie idle. As such, the track-wheel 104 may perform passive movement under the influence of external forces (e.g. like wind). In some scenarios, the track-wheel 104 may be caused to move by the external forces towards the protrusion 106. The track-wheel 104 may encounter the protrusion, may end up rolling over the protrusion 106, if the indentation 202 aligns with the protrusion 106, and exit the docking region 120. This may not be desirable, and therefore, be avoided.

In order to avoid the track-wheel 104 exiting the docking region 120, it is important that after the track-wheel is parked in the docking region 120 and before the device drivetrain may stop imparting active movement to the track-wheel, the indentation 202 is made out of alignment with the protrusion 106. To this end, the device drivetrain may cause the track-wheel 104 to slide on the support track 102 against the end-dock (for example, the top plate 114) until the indentation 202 mis-aligns with the protrusion 106. Once the indentation 202 is mis-aligned with the protrusion 106, the device drivetrain may stop imparting active movement to the track-wheel. In other words, the system 100 may be able to differentiate between the active movement caused by the device drivetrain and the passive movement caused by an external factor, like wind. This is further explained in detail in conjunction with FIG. 3.

Figure 3:
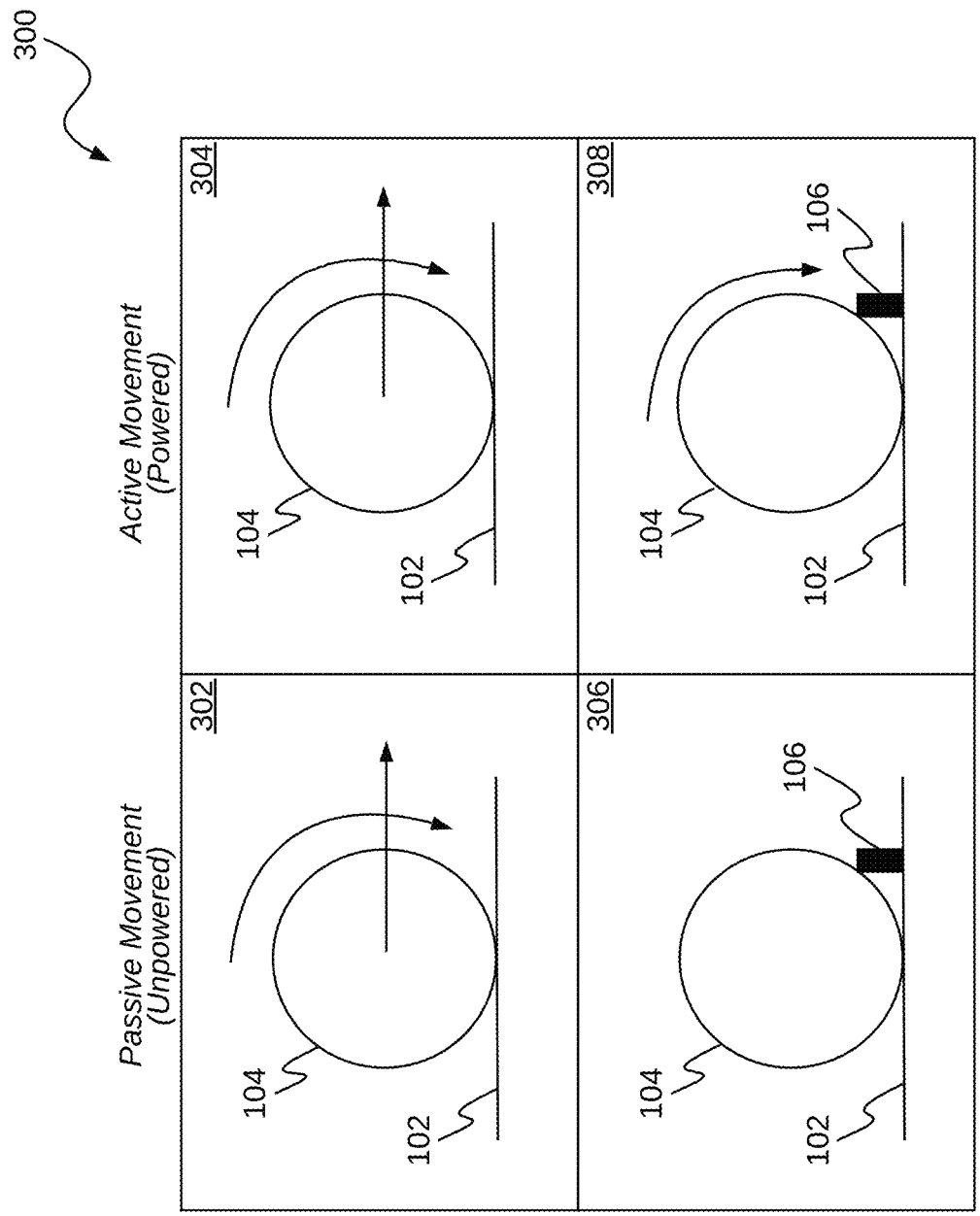
FIG. 3 is a Table depicting different scenarios of movement of a track-wheel, in accordance with some embodiments of the present disclosure.

Referring now to FIG. 3, a table 300 depicting different scenarios of the movement of the track-wheel 104 are illustrated. By way of an example, in a first scenario 302, the track-wheel 104 is imparted passive movement by an external force (e.g. wind), while the track-wheel 104 is free to roll on the support track 102 (i.e. no obstruction by a protrusion 106). In a second scenario 304, the track-wheel 104 is imparted active movement by the device drivetrain, while the track-wheel 104 is free to roll on the support track 102.

In a third scenario 306, the track-wheel 104 is imparted passive movement by an external force, and this passive movement of the track-wheel 104 is obstructed by the protrusion 106. In a fourth scenario 308, the track-wheel 104 is imparted active movement by the device drivetrain, and the movement of the track-wheel 104 is obstructed by the protrusion 106.

It may be noted that in the first scenario 302 and the second scenario 304, the track-wheel may be able to perform rotation as well as rolling (motion). In other words, the track-wheel 104 may be able to perform both rotation and rolling irrespective of whether the track-wheel is imparted passive movement by the external force, or the track-wheel is imparted active movement by the device drivetrain. As such, it is not possible to differentiate between the active movement and the passive movement.

It may be further noted that the in the third scenario 306 the track-wheel 104 is not able to perform rotation or rolling. Further, in the fourth scenario 308 the track-wheel 104 is able to perform rotation, however, the track-wheel 104 is not able to perform rolling. Therefore, instead, the track-wheel 104 may perform sliding in the fourth scenario 308. Further, in the third scenario 306 and the fourth scenario 308, where the movement of the track-wheel 104 is obstructed by the protrusion 106, it is possible to determine whether the track-wheel 104 is performing a passive movement (imparted by an external force) or an active movement (imparted by the device drivetrain). In other words, the external force may not cause sliding (slipping), and the sliding may be caused only by the device drivetrain. This phenomenon is used to dock and undock the track-wheel 104. This is further explained in detail, in conjunction with FIGS. 4A-4B.

Referring now to FIG. 4A, a process 400A of docking a track-wheel 402 in a docking region 410 is illustrated, in accordance with an embodiment of the present disclosure. The track-wheel 402 may include an indentation 404 on the circumference of the track-wheel 402. The track-wheel 402 may be configured to roll on a support track 406 having a protrusion 408. In order to roll the track-wheel 402 on the support track 406, the track-wheel 402 may be powered by a device drivetrain (not shown in the FIG. 4A). For example, the device drivetrain may include an electric motor. It may be understood that the device drivetrain may impart a rotation motion to the track-wheel 402, to thereby cause the track-wheel 402 to roll on the support track 406.

At step 412, the track-wheel 402 may lie outside the docking region 410. As shown in the FIG. 4A, the docking region 410 may extend leftwards from the protrusion 408. In order to dock the track-wheel 402, the track-wheel 402 may be powered by the device drivetrain to roll on the support track 406. As such, the track-wheel 402 may roll on the support track 406. Therefore, at step 412, the track-wheel 402 may be rotating and rolling (moving) on the support track 406. It may be noted that the track-wheel 402 may roll until the track-wheel 402 has touched the protrusion 408.

At step 414, the track-wheel 402 touches the protrusion 408, due to which the rolling of the track-wheel 402 is obstructed by the protrusion 408. As a result, the rolling of the track-wheel 402 may stop, and the track-wheel 402 may instead start sliding on the support track 406 against the protrusion 408. At step 416, the sliding of the track-wheel 402 may continue. It may be noted that track-wheel 402 may continue to slide until the indentation 404 of the track-wheel 402 may begin to engage with the protrusion 408.

At step 418, the indentation 404 of the track-wheel 402 may be engaged with the protrusion 408. As a result of the indentation 404 of the track-wheel 402 engaging with the protrusion 408, the sliding of the track-wheel 402 on the support track 406 may cease, and the track-wheel 402 may resume rolling on the support track 406. Eventually, the resuming of the rolling of the track-wheel 402 may cause the track-wheel 402 to eventually roll across the protrusion 408, i.e. in the docking region 410.

At step 420, the indentation 404 of the track-wheel 402 may start disengaging from the protrusion 408. Simultaneously, the track-wheel 402 may be rolling inside the docking region 410. It may be noted that once the track-wheel 402 has entered inside the docking region 410, the rotation motion imparted to the track-wheel 402 by the device drivetrain may be stopped. In other words, the electric motor (device drivetrain) may be switched off. As such, the track-wheel 402 may come to a standstill somewhere in the docking region 410. It may be further noted that in some embodiments, the device drivetrain may cause the track-wheel 402 to slide on the support track 102 against an end-dock (not shown in FIG. 4A) until the indentation 404 mis-aligns with the protrusion 408, and the device drivetrain may stop imparting active movement to the track-wheel 402 after the indentation 202 is mis-aligned with the protrusion 106.

It may be noted that an external factor, like wind may apply a push to the track-wheel based device, thereby causing track-wheel based device to move along the support track 406. As such, this push may cause the track-wheel 402 to roll. In some scenarios this push may cause the track-wheel based device to move in a direction towards outside the docking region 410 (i.e. right side). The track-wheel based device may continue to move in this direction until the track-wheel 402 has touched the protrusion 408.

At step 422, the track-wheel 402 may touch the protrusion 408. As a result of the track-wheel 402 touching the protrusion 408, the rolling of the track-wheel 402 may stop. It may be noted that the as the rotation motion is no more being imparted to the track-wheel 402 by the device drivetrain, the track-wheel 402 may be unable to slide on the support track 406. Due to this, the indentation 404 may not engage with the protrusion 408, and the track-wheel 402 may not be able to roll over the protrusion 408. Therefore, the track-wheel 402 is confined within the docking region 410.

It may be further noted, that in order to undock the track-wheel 402, a rotation motion must be imparted to the track-wheel 402 by the device drivetrain (i.e. the electric motor must be switched on). In other words, the track-wheel 402 cannot be undocked by an external force, like wind. For example, although, the external force may apply a push to the track-wheel based device, however, this push may not be able to cause the track-wheel based device to move out of the docking region, as the indentation 404 is mis-aligned with the protrusion 408, due to which the rolling of the track-wheel is obstructed by the protrusion 408. As such, the track-wheel 402 may be undocked only when a rotation motion is imparted to the track-wheel 402 by the device drivetrain. A process of undocking the track-wheel 402 is further explained in further detail in conjunction with FIG. 4B.

Referring now to FIG. 4B, a process 400B of undocking the track-wheel 402 is illustrated in accordance with an embodiment of the present disclosure. At step 424, the track-wheel 402 may lie inside the docking region 410. In order to undock the track-wheel 402, the track-wheel 402 may be powered by the device drivetrain causing the track-wheel 402 to roll on the support track 406. At step 424, the track-wheel 402 may touch the protrusion 408, due to which the track-wheel 402 may stop rolling, and instead the track-wheel 402 may start sliding on the support track 406 against the protrusion 408. At step 426, the sliding of the track-wheel 402 may continue. The track-wheel 402 may continue to slide until the indentation 404 of the track-wheel 402 may begin to engage with the protrusion 408.

At step 428, the indentation 404 of the track-wheel 402 may begin to engage with the protrusion 408. As a result of the indentation 404 of the track-wheel 402 engaging with the protrusion 408, the sliding of the track-wheel 402 on the support track 406 may stop, and the track-wheel 402 may resume rolling on the support track 406. Eventually, the resuming of the rolling of the track-wheel 402 may cause the track-wheel 402 to roll across the protrusion 408, i.e. outside the docking region 410. At step 430, the track-wheel 402 may have rolled, so that the indentation 404 of the track-wheel 402 may be fully engaged with the protrusion 408.

At step 432, the indentation 404 of the track-wheel 402 may start disengaging from the protrusion 408. Simultaneously, the track-wheel 402 may start rolling outside the docking region 410. At step 434, the track-wheel 402 may have completely rolled out of the docking region 410. It may, therefore, be noted that the track-wheel 402 may not be able to roll its way out of the docking region 410, merely by an external force, like wind, unless the track-wheel 402 is powered by device drivetrain like an electric motor, to rotate on its axis.

One or more techniques are disclosed above for docking a track-wheel based device inside a docking region. For example, the above techniques provide for a mechanism which is able to differentiate between different movements of the track-wheel. For example, the mechanism is able to differentiate between an active movement caused by the device drivetrain and a passive movement caused by an external force, like wind. Accordingly, the mechanism may allow the active movement and may avoid the passive movement.

Further, the above techniques provide for a simple mechanism and minimizes the number of moving parts. The above techniques further avoid any interlocking mechanism. By way of the above, the above techniques minimize chances of corrosion. Further, by way of the above, the above techniques minimize wear and tear and usage of lubricants. As such, the regular maintenance cost is reduced.

It is intended that the disclosure and examples be considered as exemplary only, with a true scope and spirit of disclosed embodiments being indicated by the following claims.

What is claimed is:

1. A system for docking or undocking a track-wheel based device, the system comprising:
 a docking station configured to be fitted on a support track for the track-wheel based device, the docking station comprising:
  a protrusion to be fitted at a first position on the support track, wherein the protrusion is configured to make the track-wheel slide on the support track against the protrusion until an indentation on the track-wheel engages with the protrusion upon alignment, and
  an end-dock to be fitted at a second position on the support track, wherein a segment of the support track between the first position and the second position is configured to accommodate the track-wheel during docking.

2. The system of claim 1, wherein the end-dock comprises a bottom plate and a top plate, wherein the bottom plate and the top plate are configured to be fitted on a bottom of the support track and a top of the support track, respectively, using a set of fasteners, and wherein the top plate is shaped to accommodate a shape of the track-wheel.

3. The system of claim 1, wherein the protrusion comprises a crown fitted on the support track using at least one fastener.

4. The system of claim 1, wherein the second position is at about the end of the support track.

5. The system of claim 1, further comprising the support track for the track-wheel based device.

6. The system of claim 1, further comprising the track-wheel based device, wherein the track-wheel comprises the indentation, and wherein the indentation comprises a hole or a depression.

7. The system of claim 6, wherein the track-wheel based device comprises a device drivetrain that causes the track-wheel to perform docking by:
 rolling on the support track until encountering the protrusion;
 sliding on the support track against the protrusion until the indentation aligns with the protrusion;
 engaging with the protrusion and rolling over the protrusion upon alignment;
 sliding on the support track against the end-dock until the indentation mis-aligns with the protrusion, and
 stopping upon misalignment.

8. The system of claim 6, wherein the track-wheel based device comprises a device drivetrain that causes the track-wheel to perform undocking by:
 sliding on the support track against the protrusion until the indentation aligns with the protrusion;
 engaging with the protrusion and roll over the protrusion upon alignment; and
 rolling on the support track.

9. The system of claim 6, wherein the track-wheel based device comprises a robotic solar panel cleaning device.

10. A track-wheel based device for operating on a support track, the track-wheel based device comprising:
 a track-wheel comprising an indentation along a circumference of the track-wheel, wherein the indentation is configured to engage with a protrusion, fitted on the support track, upon alignment; and
 a device drivetrain configured to cause the track-wheel to roll on the support track, wherein the device drivetrain is further configured to cause the track-wheel to slide on the support track against the protrusion, in response to the rolling of the track-wheel being obstructed by the protrusion, and wherein the device drivetrain is further configured to cause the track-wheel to resume the rolling upon engaging of the indentation with the protrusion.

11. The track-wheel of claim 10, wherein the device drivetrain is further configured to cause the track-wheel to slide on the support track against an end-dock, fitted on the support track, until the indentation mis-aligns with the protrusion, and wherein the device drivetrain is further configured to cause the track-wheel to stop upon misalignment.

12. The track-wheel based device of claim 10, further comprising:
 a robotic solar panel cleaning device for cleaning the solar panel.

13. The track-wheel based device of claim 10, wherein the indentation comprises a hole or a depression.

14. The track-wheel based device of claim 10, wherein the device drivetrain comprises an electric motor configured to rotate the track-wheel about an axis of the track-wheel.

* * * * *